US008927631B2

(12) United States Patent
Choi et al.

(10) Patent No.: US 8,927,631 B2
(45) Date of Patent: Jan. 6, 2015

(54) TRANSPARENT THERMOPLASTIC RESIN COMPOSITION AND MOLDED ARTICLE PREPARED THEREFROM

(71) Applicant: LG Chem, Ltd, Seoul (KR)

(72) Inventors: Jeong Su Choi, Daejeon (KR); Won Seok Lee, Daejeon (KR); Seok Goo Jang, Daejeon (KR); Roo Da Lee, Daejeon (KR); Sang Hoo Park, Daejeon (KR); Keun Hoon Yoo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/183,204

(22) Filed: Feb. 18, 2014

(65) Prior Publication Data

US 2014/0296397 A1   Oct. 2, 2014

(30) Foreign Application Priority Data

Mar. 29, 2013   (KR) .......................... 10-2013-0034832
Jan. 15, 2014   (KR) .......................... 10-2014-0005027

(51) Int. Cl.
*C08K 5/527*   (2006.01)
*C08L 33/12*   (2006.01)

(52) U.S. Cl.
CPC ..................................... *C08L 33/12* (2013.01)
USPC .......................................................... 524/120

(58) Field of Classification Search
CPC ...................................................... C08K 5/5357
USPC .......................................................... 524/120
See application file for complete search history.

(56) References Cited

U.S. PATENT DOCUMENTS 6,689,827 B1 *   2/2004   Schade et al. .................. 524/153

* cited by examiner

*Primary Examiner* — Peter Szekely
(74) *Attorney, Agent, or Firm* — McKenna Long & Aldridge, LLP

(57) ABSTRACT

Disclosed are a transparent thermoplastic resin composition and a molded article prepared therefrom. More particularly, disclosed are a transparent thermoplastic resin composition comprising A) 100 parts by weight of a rubber-reinforced thermoplastic transparent resin, and B) 0.01 to 2 parts by weight of a dihydrocarbyl pentaerythritol diphosphite wherein the A) rubber-reinforced thermoplastic transparent resin is prepared by polymerizing 5 to 60% by weight of a conjugated diene rubber, 20 to 70% by weight of a methacrylic acid alkyl ester monomer or an acrylic acid alkyl ester monomer, 8 to 50% by weight of an aromatic vinyl monomer and 0 to 20% by weight of a vinyl cyanide monomer, and a molded article prepared therefrom.

10 Claims, No Drawings

TRANSPARENT THERMOPLASTIC RESIN COMPOSITION AND MOLDED ARTICLE PREPARED THEREFROM

The present invention claims the benefit of Korean Patent Application No. 10-2013-0034832, filed on Mar. 29, 2013, and Korean Patent Application No. 10-2014-0005027, filed on Jan. 15, 2014, which are hereby incorporated by reference for all purposes as if fully set forth herein.

BACKGROUND OF THE INVENTION

1. Field of the Invention

The present invention relates to a transparent thermoplastic resin composition and a molded article prepared therefrom. More particularly, the present invention relates to a transparent thermoplastic resin composition which exhibits superior transparency, impact strength and processability and in particular, does not discolor even during long-term storage and does not discolor at 40 to 80° C., which is the condition of container transportation in the summer, and a molded article prepared therefrom.

2. Description of the Related Art

In general, an ABS resin is utilized in a variety of applications including car appliances, home appliances and OA appliances due to physical properties such as processability of styrene, strength and chemical resistance of acrylonitrile and impact resistance of butadiene, and beautiful appearance However, an ABS resin is disadvantageously limited to application for products requiring transparence, for example, transparent windows of microwaves, cleaner ducts, TV housings, game console housings and transparent windows of office machines due to opacity thereof.

Transparent resins generally used for products requiring transparency include SAN, PC, GPPS, PMMA and the like, but have problems of low impact strength and processability, as compared to ABS resins.

U.S. Pat. No. 3,787,522, JP Publication Patent No. 1988-42940 and EP Patent No. 703252 disclose rubber-reinforced thermoplastic transparent resins such as transparent ABS resins, but all of these resins have a problem of discoloration during storage for a long period of time or container transportation in the summer.

The problem of discoloration generated during long-term and high-temperature storage of transparent ABS resins remains unsolved to date. Accordingly, stock of ABS resins is minimized and discoloration is minimized by immediately using the ABS resins instead of storing the same for a long time based on the concept of first-in, first-out.

SUMMARY OF THE INVENTION

Therefore, the present invention has been made in view of the above problems, and it is one object of the present invention to provide a transparent thermoplastic resin composition which exhibits superior transparency, impact strength and processability and in particular, does not discolor even during long-term storage and does not discolor at 40 to 80° C. which is the condition of the container transportation in the summer and a molded article prepared therefrom.

The object and other objects can be accomplished by specification of the present invention described below.

In accordance with an aspect of the present invention, the above and other objects can be accomplished by the provision of a transparent thermoplastic resin composition comprising A) 100 parts by weight of a rubber-reinforced thermoplastic transparent resin and B) 0.01 to parts by weight of dihydrocarbyl pentaerythritol diphosphite, wherein the A) rubber-reinforced thermoplastic transparent resin is polymerized from 5 to 60% by weight (based on solid content) of a conjugated diene rubber, 20 to 70% by weight of a methacrylic acid alkyl ester monomer or an acrylic acid alkyl ester monomer, 8 to 50% by weight of an aromatic vinyl monomer and 0 to 20% by weight of a vinyl cyanide monomer.

As used herein, the term "transparency" means that a haze is 10 or less, 5 or less, or 3 or less.

In the rubber-reinforced thermoplastic transparent resin, a difference between a refractive index of the conjugated diene rubber and a refractive index of a resin polymerized from the monomers other than the conjugated diene rubber may be, for example, 0.02 or less.

The rubber-reinforced thermoplastic transparent resin may, for example, have an average particle diameter of 600 to 5,000 Å.

As used herein, the term "average particle diameter" means a particle diameter measured using intensity Gaussian distribution (Nicomp 380) by dynamic laser light scattering.

For example, the transparent thermoplastic resin composition may further comprise C) a copolymer resin polymerized from 30 to 95% by weight of a methacrylic acid alkyl ester monomer or an acrylic acid alkyl ester monomer, 5 to 50% by weight of an aromatic vinyl monomer and 0 to 20% by weight of a vinyl cyanide monomer.

The C) copolymer resin may be, for example, prepared by bulk polymerization.

A difference between the refractive index of the conjugated diene rubber of the A) rubber-reinforced thermoplastic transparent resin and the refractive index of the C) copolymer resin is for example 0.02 or less.

A content ratio of the A) rubber-reinforced thermoplastic transparent resin to the C) copolymer resin may be, for example, 1:9 to 6:4.

Hydrocarbyl groups of the B) dihydrocarbyl pentaerythritol diphosphite are for example independently a C10-C20 alkyl group or a C10-C20 aryl group.

The hydrocarbyl groups of the B) dihydrocarbyl pentaerythritol diphosphite may be, for example, independently isodecyl, tridecyl, lauryl, mystryl, stearyl, phenyl or di-tert-butylphenyl.

The transparent thermoplastic resin composition may further for example comprise at least one selected from the group consisting of a phenol stabilizer, a phosphite stabilizer and a thioester stabilizer.

The stabilizer may be, for example, present in an amount of 0.01 to 2.0 parts by weight.

In another aspect of the present invention, provided is a molded article prepared from the transparent thermoplastic resin composition.

The molded article may be, for example, an injection-molded article.

Effectiveness of the Invention

As apparent from the fore-going, the present invention advantageously provides a transparent thermoplastic resin composition which exhibits superior transparency, impact strength and processability and in particular, superior long-term storage stability, thus does not discolor even during long-term transportation and storage and does not discolor at 40 to 80° C., which is the condition of container transportation in the summer, and a molded article prepared therefrom.

DETAILED DESCRIPTION OF THE INVENTION

Hereinafter, the present invention will be described in detail.

The transparent thermoplastic resin composition comprises A) 100 parts by weight of a rubber-reinforced thermoplastic transparent resin and B) 0.01 to 3 parts by weight of dihydrocarbyl pentaerythritol diphosphite, wherein the A) rubber-reinforced thermoplastic transparent resin is polymerized from 5 to 60% by weight (based on solid content) of a conjugated diene rubber, 20 to 70% by weight of a methacrylic acid alkyl ester monomer or an acrylic acid alkyl ester monomer, 8 to 50% by weight of an aromatic vinyl monomer and 0 to 20% by weight of a vinyl cyanide monomer.

The A) rubber-reinforced thermoplastic transparent resin is for example polymerized from 5 to 40% by weight (based on solid content) of the conjugated diene rubber, 40 to 70% by weight of the methacrylic acid alkyl ester monomer or the acrylic acid alkyl ester monomer, 10 to 40% by weight of the aromatic vinyl monomer and 1 to 15% by weight of the vinyl cyanide monomer.

In another example, the A) rubber-reinforced thermoplastic transparent resin may be polymerized from 5 to 30% by weight (based on solid content) of the conjugated diene rubber, 50 to 70% by weight of the methacrylic acid alkyl ester monomer or the acrylic acid alkyl ester monomer, 15 to 35% by weight of the aromatic vinyl monomer and 1 to 10% by weight of the vinyl cyanide monomer.

In another example, the A) rubber-reinforced thermoplastic transparent resin may be polymerized from 10 to 20% by weight (based on solid content) of the conjugated diene rubber, 55 to 70% by weight of the methacrylic acid alkyl ester monomer or the acrylic acid alkyl ester monomer, 15 to 30% by weight of the aromatic vinyl monomer and 1 to 5% by weight of the vinyl cyanide monomer.

The conjugated diene rubber may be for example a butadiene polymer, a butadiene-styrene copolymer (SBR), a butadiene-acrylonitrile copolymer (NBR), an ethylene-propylene copolymer (EPDM) or the like, preferably a butadiene polymer or a butadiene-styrene copolymer.

The methacrylic acid alkyl ester monomer may for example comprise at least one selected from the group consisting of methacrylic acid methyl ester, methacrylic acid ethyl ester, methacrylic acid propyl ester, methacrylic acid 2-ethyl hexyl ester, methacrylic acid decyl ester and methacrylic acid lauryl ester, preferably, methacrylic acid methyl ester, more preferably methyl methacrylate.

The acrylic acid alkyl ester monomer may for example comprise at least one selected from the group consisting of acrylic acid methyl ester, acrylic acid ethyl ester, acrylic acid propyl ester, acrylic acid 2-ethyl hexyl ester, acrylic acid decyl ester, acrylic acid lauryl ester and the like, preferably acrylic acid methyl ester, more preferably methyl acrylate.

The aromatic vinyl monomer may for example comprise at least one selected from the group consisting of styrene, α-methylstyrene, p-methylstyrene, vinyl toluene and the like, preferably styrene.

The vinyl cyanide monomer may be for example acrylonitrile, methacrylonitrile or a mixture thereof.

The A) rubber-reinforced thermoplastic transparent resin may for example have a haze of 10 or less, 5 or less, or 3 or less. Upon bonding to the dihydrocarbyl pentaerythritol diphosphite within this range, the effect of improving long-term and high-temperature storage stability is excellent.

In the A) rubber-reinforced thermoplastic transparent resin, difference between a refractive index of the conjugated diene rubber and a refractive index of a resin polymerized from monomers other than the conjugated diene rubber may be for example 0.02 or less, 0.020 or less, 0.01 or less, or 0.005 or less.

As such, when the refractive index of the conjugated diene rubber used as a core is similar or equal to the refractive index of the resin polymerized from the remaining monomers grafted thereto, scattering and refraction of light generated at the interface between a dispersed phase (rubber) and a continuous phase (matrix resin) is minimized and transparency is thus excellent.

The refractive index of the resin comprising the remaining monomers may be for example calculated by the following Equation 1:

$$\text{Refractive index of resin} = (WtA*RIA) + (WtS*RIS) + (WtM*RIM) \quad \text{[Equation 1]}$$

wherein WtA represents wt % of vinyl cyanide monomer, RIA represents a refractive index of vinyl cyanide polymer, WtS represents wt % of aromatic vinyl monomer, RIS represents refractive index of aromatic vinyl polymer, WtM represents wt % of acrylic acid alkyl ester or methacrylic acid alkyl ester monomer, and RIS represents refractive index of acrylic acid alkyl ester or methacrylic acid alkyl ester polymer.

For example, a refractive index of polyacrylonitrile is 1.52, a refractive index of polystyrene is 1.592, and a refractive index of polymethylmethacrylate is 1.49. These refractive indexes may be for example measured using an Abbe refractometer.

The A) rubber-reinforced thermoplastic transparent resin may for example have an average particle diameter of 600 to 5,000 Å, 1,000 to 4,500 Å, 1,500 to 4,000 Å, or 2,500 to 3,500 Å.

A preparation method of the A) rubber-reinforced thermoplastic transparent resin is not particularly limited, but may be, for example, emulsion polymerization, suspension polymerization or bulk polymerization.

In another example, the preparation method of the A) rubber-reinforced thermoplastic transparent resin may comprise i) graft-copolymerizing 5 to 60% by weight (based on solid content) of a conjugated diene rubber with 20 to 70% by weight of a methacrylic acid alkyl ester monomer or an acrylic acid alkyl ester monomer, 8 to 50% by weight of an aromatic vinyl monomer and 0 to 20% by weight of a vinyl cyanide monomer to obtain a graft copolymer as a latex and ii) aggregating, dehydrating and drying the latex to collect a dry powder of the latex. In this case, initial equipment and preparation process can be simplified.

The B) dihydrocarbyl pentaerythritol diphosphite may be for example present in an amount of 0.01 to 1.0 parts by weight, 0.05 to 0.5 parts by weight or 0.1 to 0.4 parts by weight. Within this range, there is an advantage in that long-term and high-temperature storage stability is excellent.

Hydrocarbyl groups of the B) dihydrocarbyl pentaerythritol diphosphite may for example each independently be a C10-C20, C15-C20 or C16-C20 alkyl or aryl group.

The hydrocarbyl groups of the B) dihydrocarbyl pentaerythritol diphosphite may be for example each independently isodecyl, tridecyl, lauryl, mystryl, stearyl, phenyl or di-tert-butylphenyl.

In another example, the B) dihydrocarbyl pentaerythritol diphosphite may be distearyl pentaerythritol diphosphite, bis (2,4-di-tert-butylphenyl)pentaerythritol diphosphite or a mixture thereof. In this case, there is an advantage in that long-term and high-temperature storage stability and transparency are excellent.

The transparent thermoplastic resin composition may further for example comprise C) a copolymer resin polymerized from 30 to 95% by weight of a methacrylic acid alkyl ester monomer or an acrylic acid alkyl ester monomer, 5 to 50% by weight of an aromatic vinyl monomer, and 0 to 20% by weight of a vinyl cyanide monomer.

The C) copolymer resin may for example comprise 50 to 85% by weight of the methacrylic acid alkyl ester monomer or the acrylic acid alkyl ester monomer, 10 to 40% by weight of the aromatic vinyl monomer and 1 to 15% by weight of the vinyl cyanide monomer.

In another example, the (C) copolymer resin may comprise 60 to 80% by weight of the methacrylic acid alkyl ester monomer or the acrylic acid alkyl ester monomer, 15 to 35% by weight of the aromatic vinyl monomer and 5 to 10% by weight of the vinyl cyanide monomer.

The methacrylic acid alkyl ester monomer may for example comprise at least one selected from the group consisting of methacrylic acid methyl ester, methacrylic acid ethyl ester, methacrylic acid propyl ester, methacrylic acid 2-ethyl hexyl ester, methacrylic acid decyl ester and methacrylic acid lauryl ester, preferably methacrylic acid methyl ester, more preferably methyl methacrylate.

The acrylic acid alkyl ester monomer may for example comprise at least one selected from the group consisting of acrylic acid methyl ester, acrylic acid ethyl ester, acrylic acid propyl ester, acrylic acid 2-ethyl hexyl ester, acrylic acid decyl ester, acrylic acid lauryl ester and the like, preferably acrylic acid methyl ester, more preferably methyl acrylate.

The aromatic vinyl monomer may, for example, comprise at least one selected from the group consisting of styrene, α-methylstyrene, p-methylstyrene, vinyl toluene and the like and may be preferably styrene.

The vinyl cyanide monomer may be, for example, acrylonitrile, methacrylonitrile or a mixture thereof.

The C) copolymer resin may be, for example, prepared by bulk polymerization and suspension polymerization. In this case, there is an advantage in that high-temperature storage stability is excellent.

The difference between the refractive index of the conjugated diene rubber of the A) rubber-reinforced thermoplastic transparent resin and the refractive index of the C) copolymer resin may be for example 0.02 or less, 0.020 or less, 0.01 or less, or 0.005 or less. Within this range, there is an advantage in which transparency is excellent.

A content ratio of the A) rubber-reinforced thermoplastic transparent resin to the C) copolymer resin may be for example 1:9 to 9:1, or 2:8 to 6:4.

The total weight of the methacrylic acid alkyl ester monomer and the acrylic acid alkyl ester monomer contained in the A) rubber-reinforced thermoplastic transparent resin and the C) copolymer resin may be 40 to 70% by weight, 50 to 70% by weight, or 55 to 65% by weight, based on 100% by weight in total of the A) and C) resins.

A preparation method of the C) copolymer resin may be, for example, bulk polymerization or suspension polymerization, preferably bulk polymerization. In this case, there are advantages in that control of rubber content is easy, preparation cost is reduced and production yield is greatly increased.

The transparent thermoplastic resin composition may further for example comprise at least stabilizer selected from the group consisting of a phenol stabilizer, a phosphite stabilizer and a thioester stabilizer.

In another example, the transparent thermoplastic resin composition may comprise a phenol stabilizer as a primary stabilizer and a phosphite and/or thioester stabilizer as a secondary stabilizer.

The stabilizer may be for example present in an amount of 0.01 to 2.0 parts by weight, 0.05 to 1.0 parts by weight, or 0.1 to 0.5 parts by weight.

For example, the transparent thermoplastic resin composition may optionally further comprise at least additive selected from the group consisting of a UV stabilizer, a fluorescent whitening agent, a lubricant and the like, so long as the additive does not have negative effects on physical properties.

The additive may be for example present in an amount of 0.001 to 10 parts by weight, 0.01 to 1.0 parts by weight, or 0.1 to 0.5 parts by weight, based on 100 parts by weight in total of the A) rubber-reinforced thermoplastic transparent resin and the C) copolymer resin.

The transparent thermoplastic resin composition may have for example a haze of 10 or less, 5 or less, or 3 or less.

The transparent thermoplastic resin composition may be, for example, prepared by melt-mixing the A) rubber-reinforced thermoplastic transparent resin with the B) dihydrocarbyl pentaerythritol diphosphite.

In another example, the transparent thermoplastic resin composition may be prepared by method including i) melt-mixing the A) rubber-reinforced thermoplastic transparent resin with the C) copolymer resin to prepare a resin mixture; and ii) melt-mixing the prepared resin mixture with B) the dihydrocarbyl pentaerythritol diphosphite to prepare the transparent thermoplastic resin composition.

In another example, the B) dihydrocarbyl pentaerythritol diphosphite may be added before aggregation and immediately after polymerization of the A) rubber-reinforced thermoplastic transparent resin (latex state), before dehydration and after aggregation, or during drying or post-processing.

In another example, the B) dihydrocarbyl pentaerythritol diphosphite may be added during polymerization of the C) copolymer resin or a post-polymerization process.

In another example, the B) dihydrocarbyl pentaerythritol diphosphite may be added during an extrusion process.

The melt-mixing may be for example performed using a single screw extruder, a twin-screw extruder, a Banbury mixer or the like.

The molded article of the present invention is characterized in that it is prepared from the transparent thermoplastic resin composition.

The molded article may be, for example, an injection-molded article.

In another example, the molded article may be a transparent window of a microwave, a cleaner duct, a TV housing, a game console housing or a transparent window of an office machine.

The molded article may be, for example, prepared by melt-mixing the transparent thermoplastic resin composition according to the present invention using an extruder to prepare the resin composition into a pellet and injection-molding the prepared pellet to produce a molded article.

Hereinafter, preferred examples will be provided for better understanding of the present invention. These examples are only provided to illustrate the present invention and it will be apparent to those skilled in the art that various modifications and alternations are possible within the scope and technical range of the present invention. Such modifications and alternations fall within the scope of claims attached hereto.

EXAMPLE

Preparation Example A-1

Thermoplastic Transparent Resin-1

100 parts by weight of ion exchange water, 1.0 part by weight of a sodium oleate emulsifier, 60 parts by weight of methylmethacrylate, 22 parts by weight of styrene, 3 parts by weight of acrylonitrile, 0.6 parts by weight of tertiary dodecyl mercaptan, 0.048 parts by weight of sodium formaldehyde sulfoxylate, 0.012 parts by weight of ethylene diamine tetraacetic acid, 0.001 parts by weight of ferrous sulfate and 0.08 parts by weight of cumene hydroperoxide were continuously added at 75° C. for 5 hours to 15 parts by weight (based on solid content) of a butadiene rubber latex having a refractive index of 1.517, a gel content of 70% and an average particle diameter of 0.3 µm prepared by emulsion polymerization, followed by proceeding reaction. After the reaction, the reaction solution was heated to 80° C. and aged for one hour and reaction was then finished. At this time, a polymerization conversion ratio was 98.5% and a solid coagulum of latex was 0.3%. Then, the latex was solidified with an aqueous calcium chloride solution and washed to prepare a thermoplastic transparent resin-1 as a powder. At this time, a methyl methacrylate-styrene-acrylonitrile resin had a refractive index of 1.517 (that is, difference in refractive index with butadiene rubber=0).

Preparation Example A-2

Thermoplastic Transparent Resin-2

<Preparation of ABS Graft Resin>

100 parts by weight of ion exchange water, 1.0 part by weight of a sodium oleate emulsifier, 34.5 parts by weight of methyl methacrylate, 12.5 parts by weight of styrene, 3 parts by weight of acrylonitrile, 0.5 parts by weight of tertiary dodecyl mercaptan, 0.048 parts by weight of sodium formaldehyde sulfoxylate, 0.012 parts by weight of ethylene diamine tetraacetic acid, 0.001 parts by weight of ferrous sulfate and 0.08 parts by weight of cumene hydroperoxide were continuously added at 70° C. for 4 hours to 50 parts by weight (based on solid content) of a butadiene rubber latex having a refractive index of 1.517, a gel content of 70% and an average particle diameter of 0.3 µm prepared by emulsion polymerization, followed by proceeding reaction. After the reaction, the reaction solution was heated to 75° C. and aged for one hour and reaction was then finished. At this time, a polymerization conversion ratio was 98.0% and a solid coagulum of latex was 0.3%. Then, the latex was solidified with an aqueous calcium chloride solution and washed to prepare an ABS graft resin as a powder. At this time, a methyl methacrylate-styrene-acrylonitrile resin had a refractive index of 1.517.

<Preparation of MSA Copolymer Resin>

A raw material obtained by mixing 30 parts by weight of toluene as a solvent, 0.02 parts by weight of 1,1-bis(t-butylperoxy)-3,3,5-trimethyl cyclohexane as an initiator, and 0.15 parts by weight of tertiary dodecyl mercaptan as a molecular weight controller with 69 parts by weight of methyl methacrylate, 24 parts by weight of styrene and 7 parts by weight of acrylonitrile was continuously added to a reactor until an average reaction time reached 3 hours and reaction temperature was maintained at 148° C. Then, the polymerization solution was discharged from the reactor, the discharged polymerization solution was heated in a preliminary heating bath, unreacted monomers were evaporated in an evaporation bath and an MSA copolymer resin was obtained as a pellet using a polymer transport pump extrusion processor while maintaining the temperature of the polymer at 210° C. The prepared MSA copolymer resin had a refractive index of 1.516.

<Preparation of Thermoplastic Transparent Resin Composition>

30 parts by weight of the ABS graft resin obtained above was mixed with 70 parts by weight of the MSA copolymer resin obtained above in a mixer and a thermoplastic transparent resin-2 was then prepared as a pellet at a cylinder temperature of 220° C. using a twin-screw extrusion mixer.

Preparation Example A-3

Thermoplastic Transparent Resin-3

A thermoplastic transparent resin-3 was prepared as a pellet in the same manner as in Preparation Example A-2, except that 45 parts by weight of methyl methacrylate and 48 parts by weight of styrene were used in <Preparation of MSA copolymer resin> of Preparation Example A-2. The MSA copolymer resin thus prepared had a refractive index of 1.54.

Preparation Example A-4

Thermoplastic Transparent Resin-4

A thermoplastic transparent resin-4 was prepared as a pellet in the same manner as in Preparation Example A-2, except that 50 parts by weight of the ABS graft resin and 50 parts by weight of the MSA copolymer resin obtained in <Preparation of Thermoplastic Transparent Resin Composition Resin> of Preparation Example A-2 were used.

Examples 1 to 7 and Comparative Examples 1 to 9

Thermoplastic transparent resins (A-1, A-2 and A-3) prepared in the preparation examples were mixed with distearyl pentaerythritol diphosphite (hereinafter, referred to as "DPD"), bis(2,4-di-tert-butylphenyl) pentaerythritol diphosphite (hereinafter, referred to as "BPD") and an antioxidant (B) set forth in the following Table 1, as shown in the following Table 2, 0.3 parts by weight of a lubricant was further added thereto, and a transparent thermoplastic resin composition was prepared as a pellet at a cylinder temperature of 220° C. using a twin-screw extrusion mixer. The prepared pellet was injection-molded to produce 3 mm sheet samples.

TABLE 1

| Used stabilizers | |
|---|---|
| Type | Structure |
| B-1 | Tris(2,4-di-tert-butylphnyl) phosphite (IF168) |
| B-2 | Tetrakis[methylene-3-(3,5-di-tert-butyl-4-hydroxyphenyl)propionate] (IR1010) |
| B-3 | Triethyleneglycol-bis-3-(3-tert-butyl-4-hydroxy-5-methylphenyl)propionate (IR245) |
| B-4 | Octadecyl-3-(3,5-di-tert-butyl-4-hydrxyphenyl)propionate (IR1076) |
| B-5 | Dilauryl thiodipropionate |
| B-6 | Pentaerythrityl tetrakis(3-laurylthiopropionate) (ADEKA STAB AO-412S) |

Test Example

Properties of the transparent thermoplastic resin composition samples prepared in Examples 1 to 7 and Comparative Examples 1 to 9 were measured in accordance with the following method and results are shown in the following Table 3.

Gel content: rubber latex was solidified with methanol, washed and dried in a 60° C. vacuum oven for 24 hours, the resulting rubber clump was sliced with scissors, 1 g of the resulting rubber slice was added to 100 g of toluene, the mixture was stored in a dark room at room temperature for 48 hours and thus separated into a sol and a gel. Gel content was calculated by the following Equation.

Gel content(%)=[Weight of insoluble matter(gel)/ weight of sample]×100

Average particle diameter: average particle diameter of latex was measured using intensity Gaussian distribution (Nicomp 380) by dynamic laser light scattering Refractive index: measured using Abbe refractometer Haze: measured in accordance with ASTM 1003

Color (Hunter Lab): Hunter Lab values were measured using Color Quest II.

Long-term storage test: 6 months after a pellet prepared as shown in Table 2 was stored in a dark room, the pellet was injected, color values were measured and ΔE (long-term storage stability) was calculated in accordance with the following equation.

$$\Delta E(\text{long-term storage}) = \sqrt{(L-L')^2 + (a-a')^2 + (b-b')^2}$$

L, a, b=color values measured immediately after extrusion
L', a', b'=color values measured after storage for 6 months Oven storage test: after the pellet prepared as shown in Table 2 was stored at 80° C. in an oven for one week, the pellet was injected, color values were measured and ΔE (high-temperature storage stability) was calculated in accordance with the following equation.

$$\Delta E(\text{Oven}) = \sqrt{(L-L'')^2 + (a-a'')^2 + (b-b'')^2}$$

L, a, b=color values measured immediately after extrusion
L", a", b"=color values measured after storage for 6 months

TABLE 3

|  | Haze | L | a | b | ΔE (long-term storage) | ΔE (Oven) |
|---|---|---|---|---|---|---|
| Example 1 | 1.9 | 95.8 | −1.1 | 0.8 | 0.6 | 0.4 |
| Example 2 | 2.2 | 95.6 | −1.2 | 0.9 | 0.7 | 0.6 |
| Example 3 | 2.0 | 95.9 | −1.1 | 1.1 | 0.7 | 0.5 |
| Example 4 | 2.0 | 96.0 | −1.0 | 0.4 | 0.5 | 0.6 |
| Example 5 | 2.3 | 95.0 | −1.0 | 0.8 | 0.9 | 0.9 |
| Example 6 | 2.5 | 95.0 | −0.9 | 0.4 | 0.4 | 0.4 |
| Example 7 | 2.2 | 95.1 | −1.0 | 1.7 | 0.7 | 0.8 |
| Comparative Example 1 | 2.1 | 95.8 | −1.1 | 1.0 | 2.4 | 2.0 |
| Comparative Example 2 | 2.0 | 96.0 | −1.0 | 0.8 | 2.6 | 2.1 |
| Comparative Example 3 | 2.0 | 96.1 | −1.0 | 0.4 | 2.0 | 1.9 |
| Comparative Example 4 | 2.0 | 95.8 | −1.2 | 1.0 | 2.2 | 2.3 |
| Comparative Example 5 | 1.9 | 95.9 | −1.0 | 0.5 | 1.8 | 1.7 |
| Comparative Example 6 | 2.0 | 96.0 | −1.0 | 0.3 | 2.1 | 2.4 |
| Comparative Example 7 | >90 | 84.1 | −1.2 | 2.1 | 0.4 | 0.3 |
| Comparative Example 8 | 1.9 | 96.1 | −1.2 | 1.8 | 2.6 | 2.7 |
| Comparative Example 9 | 21.2 | 92.5 | −1.0 | 0.2 | 0.4 | 0.2 |

As can be seen from Table 3, the transparent thermoplastic resin compositions (Examples 1 to 7) according to the present invention exhibited ΔE of 1 or less both during long-term storage for 6 months and during storage at 80° C. in an oven for one week, which demonstrated that the transparent thermoplastic resin compositions exhibited considerably superior long-term and high-temperature storage stability.

However, it could be seen that the transparent thermoplastic resin compositions (Comparative Examples 1 to 6, and 8) comprising no dihydrocarbyl pentaerythritol diphosphite or

TABLE 2

|  | Transparent resin | | | | | | Stabilizer | | | | | |
|---|---|---|---|---|---|---|---|---|---|---|---|---|
|  | A-1 | A-2 | A-3 | A-4 | DPD | BPD | B1 | B2 | B3 | B4 | B5 | B6 |
| Example 1 |  | 100 |  |  | 0.3 |  |  |  |  |  |  |  |
| Example 2 | 100 |  |  |  | 0.2 |  |  |  |  | 0.2 |  |  |
| Example 3 |  | 100 |  |  | 0.2 |  |  | 0.2 |  |  |  |  |
| Example 4 |  | 100 |  |  | 0.2 |  |  | 0.1 |  |  |  | 0.1 |
| Example 5 |  | 100 |  |  |  | 0.5 |  | 0.2 |  |  |  |  |
| Example 6 |  | 100 |  |  | 1.0 |  |  |  |  |  |  |  |
| Example 7 |  |  |  | 100 | 0.3 |  |  |  |  | 0.2 |  |  |
| Comparative Example 1 |  | 100 |  |  |  |  | 0.2 | 0.2 |  |  |  |  |
| Comparative Example 2 |  | 100 |  |  |  |  |  | 0.2 |  | 0.2 |  |  |
| Comparative Example 3 |  | 100 |  |  |  |  |  | 0.2 |  |  | 0.2 |  |
| Comparative Example 4 |  | 100 |  |  |  |  |  |  | 0.2 |  |  |  |
| Comparative Example 5 |  | 100 |  |  |  |  |  |  |  |  |  | 0.2 |
| Comparative Example 6 |  | 100 |  |  |  |  |  |  |  | 0.2 | 0.2 |  |
| Comparative Example 7 |  |  | 100 |  | 0.2 |  |  |  |  |  |  |  |
| Comparative Example 8 |  | 100 |  |  | 0.001 |  |  | 0.2 |  |  |  |  |
| Comparative Example 9 |  | 100 |  |  | 5.0 |  |  |  |  |  |  |  | comprising an excessively small amount of the same exhibited considerably bad long-term and high-temperature storage stability.

In addition, the transparent thermoplastic resin composition (Comparative Example 9) comprising an excessively high amount of dihydrocarbyl pentaerythritol diphosphite had a haze exceeding 10, which ascertained that the transparent thermoplastic resin composition exhibited remarkably bad transparency.

In addition, the thermoplastic resin composition (Comparative Example 7) wherein a difference in refractive index between the butadiene rubber and the MSA copolymer resin exceeded 0.02 had a haze exceeding 90, which ascertained that the thermoplastic resin composition was opaque.

What is claimed is:

1. A transparent thermoplastic resin composition comprising:
    100 parts by weight of a rubber-reinforced thermoplastic transparent resin having a haze of 10 or less;
    a copolymer resin; and
    0.01 to 3 parts by weight of a dihydrocarbyl pentaerythritol diphosphite,
    wherein a content ratio of the rubber-reinforced thermoplastic transparent resin to the copolymer resin is 1:9 to 9:1,
    wherein the rubber-reinforced thermoplastic transparent resin is graft-polymerized from 5 to 60% by weight of a conjugated diene rubber, 20 to 70% by weight of a methacrylic acid alkyl ester monomer or an acrylic acid alkyl ester monomer, 8 to 50% by weight of an aromatic vinyl monomer and 0 to 20% by weight of a vinyl cyanide monomer, and a difference between a refractive index of the conjugated diene rubber and a refractive index of a resin polymerized from the monomers other than the conjugated diene rubber is 0.02 or less, and
    wherein the copolymer resin is bulk polymerized from 30 to 95% by weight of a methacrylic acid alkyl ester monomer or an acrylic acid alkyl ester monomer, 5 to 50% by weight of an aromatic vinyl monomer and 0 to 20% by weight of a vinyl cyanide monomer.

2. The transparent thermoplastic resin composition according to claim 1, wherein the rubber-reinforced thermoplastic transparent resin has a haze of 3 or less.

3. The transparent thermoplastic resin composition according to claim 1, wherein a difference between the refractive index of the conjugated diene rubber of the rubber-reinforced thermoplastic transparent resin and a refractive index of the copolymer resin is 0.01 or less.

4. The transparent thermoplastic resin composition according to claim 1, wherein hydrocarbyl groups of the dihydrocarbyl pentaerythritol diphosphite are each independently a C10-C20 alkyl group or a C10-C20 aryl group.

5. The transparent thermoplastic resin composition according to claim 4, wherein the hydrocarbyl groups of the dihydrocarbyl pentaerythritol diphosphite are each independently isodecyl, tridecyl, lauryl, mystryl, stearyl, phenyl or di-tert-butylphenyl.

6. The transparent thermoplastic resin composition according to claim 1, wherein the transparent thermoplastic resin composition further comprises at least stabilizer selected from the group consisting of a phenol stabilizer, a phosphite stabilizer and a thioester stabilizer.

7. The transparent thermoplastic resin composition according to claim 6, wherein the stabilizer is present in an amount of 0.01 to 2.0 parts by weight.

8. A molded article comprising the transparent thermoplastic resin composition according to claim 1.

9. A transparent thermoplastic resin composition comprising:
    100 parts by weight of a rubber-reinforced thermoplastic transparent resin having an average particle diameter of 600 to 5,000 Å and having a haze of 3 or less,
    a copolymer resin; and
    0.01 to 3 parts by weight of a dihydrocarbyl pentaerythritol diphosphite,
    wherein the rubber-reinforced thermoplastic transparent resin is polymerized from 5 to 30% by weight of a conjugated diene rubber, 50 to 70% by weight of a methacrylic acid alkyl ester monomer or an acrylic acid alkyl ester monomer, 15 to 35% by weight of an aromatic vinyl monomer and 1 to 10% by weight of a vinyl cyanide monomer, wherein a difference between a refractive index of the conjugated diene rubber and a refractive index of a resin polymerized from the monomers other than the conjugated diene rubber is 0.02 or less, and
    wherein the hydrocarbyl groups of the dihydrocarbyl pentaerythritol diphosphite are each independently a C10-C20 alkyl group or a C10-C20 aryl group.

10. The transparent thermoplastic resin composition according to claim 9, wherein the transparent thermoplastic resin composition further comprises at least stabilizer selected from the group consisting of a phenol stabilizer, a phosphite stabilizer and a thioester stabilizer in an amount of 0.01 to 2.0 parts by weight.

* * * * *